United States Patent
Hardimon

(10) Patent No.: US 11,795,181 B2
(45) Date of Patent: Oct. 24, 2023

(54) BASIC COPPER GLUCONATE

(71) Applicant: JOST CHEMICAL CO., St. Louis, MO (US)

(72) Inventor: Joseph R. Hardimon, Belleville, IL (US)

(73) Assignee: Jost Chemical Co., St. Louis, MO (US)

( * ) Notice: Subject to any disclaimer, the term of this patent is extended or adjusted under 35 U.S.C. 154(b) by 217 days.

(21) Appl. No.: 17/333,981

(22) Filed: May 28, 2021

(65) Prior Publication Data

US 2021/0371434 A1     Dec. 2, 2021

Related U.S. Application Data

(60) Provisional application No. 63/031,066, filed on May 28, 2020.

(51) Int. Cl.
    *C07F 1/00*        (2006.01)

(52) U.S. Cl.
    CPC ................... *C07F 1/005* (2013.01)

(58) Field of Classification Search
    CPC ........................................ C07F 1/005
    See application file for complete search history.

(56) References Cited

FOREIGN PATENT DOCUMENTS

CN        107286011      * 10/2017

OTHER PUBLICATIONS

CN107286011 translated Published 2017 (Year: 2017).*
Yushan et al. (Synthesis of cupric gluconate by solid phase reaction at room temperature, Guangzhou Huagong, vol. 26 Issue: 1, pp. 13-15, Published 1988). (Year: 1988).*

* cited by examiner

*Primary Examiner* — Jafar F Parsa
*Assistant Examiner* — Blaine G Doletski
(74) *Attorney, Agent, or Firm* — Sandberg Phoenix & von Gontard PC

(57) ABSTRACT

Basic copper gluconate having a formula of $C_6H_{12}CuO_8$—X $H_2O$ and the structure of:

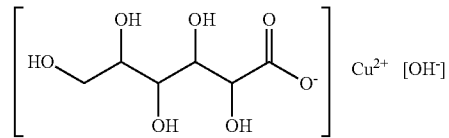

The basic copper gluconate has a theoretical copper content of 23.1% (anhydrous).

5 Claims, 6 Drawing Sheets

SEM Imaging of Basic Copper Gluconate

SEM Imaging of Copper Gluconate

SEM Imaging of Basic Copper Gluconate

BASIC COPPER GLUCONATE

CROSS-REFERENCE TO RELATED APPLICATIONS

This application claims priority to US App. No. 63/031,066 filed May 28, 2020, entitled "Basic Copper Gluconate", and which is incorporated herein by reference.

STATEMENT REGARDING FEDERALLY SPONSORED RESEARCH OR DEVELOPMENT

Not Applicable.

BACKGROUND

Copper gluconate, having a formula $Cu[C_6H_{11}O_7]_2$—X $H_2O$ and the structure

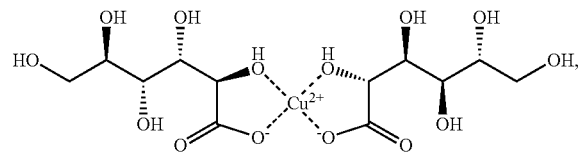

is used in formulations when copper metal is desired as a nutrient or micro-nutrient in nutritional supplements, foods and oral care products. Copper gluconate is typically used in lieu of mineral acid salts such as copper sulfate pentahydrate ($CuSO_4 \cdot 5H_2O$) when a gentler effect on the digestive system is desired. Both copper gluconate and copper sulfate pentahydrate exhibit excellent aqueous solubility; however; copper gluconate (having a molecular mass of 453.8 g/mol (anhydrous)) has a copper loading of 14.4% Cu, which is much lower that of copper sulfate pentahydrate (having a molecular mass of 249.685 g/mol) which has a copper loading of 25.4% Cu. This lower copper loading thus limits the use of copper gluconate use in foods, beverages, and other oral applications economically and or spatially because the need for higher copper gluconate loadings to achieve similar copper content level of copper sulfate pentahydrate is required.

It would thus be desirable to provide a copper compound which, like Copper Gluconate, is gentler on the digestive system, but which has a copper loading more in line with the copper loading of copper sulfate pentahydrate.

BRIEF SUMMARY

Briefly, a basic copper gluconate having a molecular formula of $Cu[OH][C_6H_{11}O_7]$—X $H_2O$ has been developed, and which is believed to have the following structure:

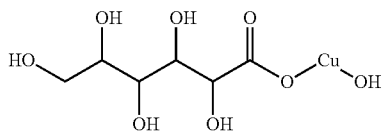

The ionic structure is believed to be as follows:

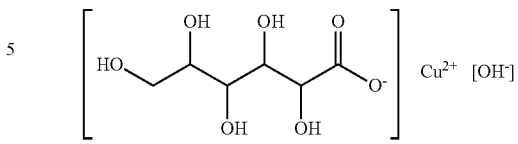

The basic copper gluconate incorporates an equal molar ratio of gluconic acid and copper, neutralized with a hydroxyl group. It thus has a metal:ligand:hydroxyl ratio of 1:1:1. It has a theoretical copper content of 23.1% (anhydrous). Without sacrificing outstanding aqueous solubility and gut sensitivity, this new complex mitigates the need for higher loadings of a "copper gluconate salt" to achieve comparable copper content in a formulation in lieu of copper sulfate pentahydrate in a formulation.

BRIEF DESCRIPTION OF THE DRAWINGS

Corresponding reference numerals will be used throughout the several figures of the drawings.

DETAILED DESCRIPTION

Figure 1:
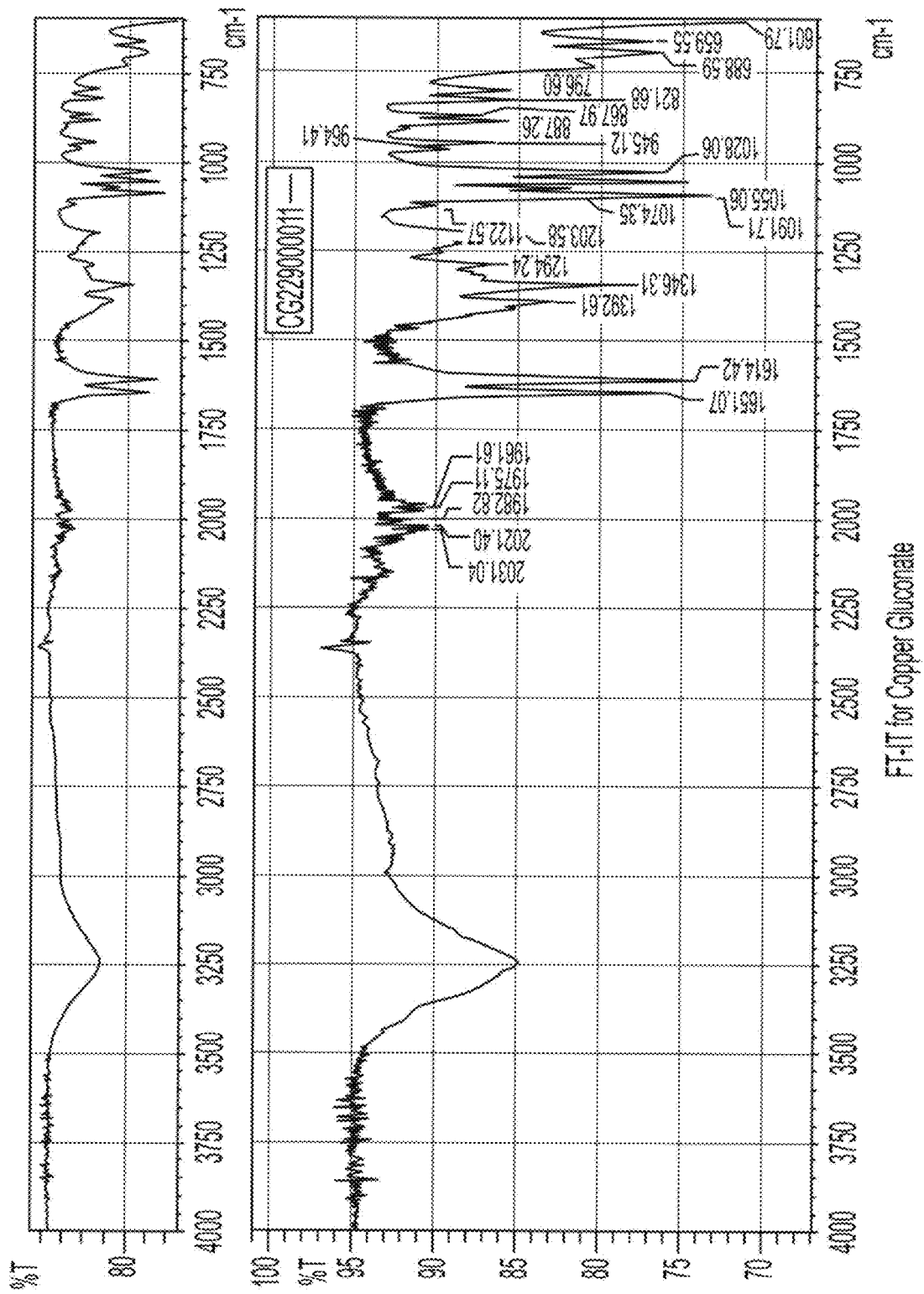
FIG. 1 is an FT-IR graph of copper gluconate.

The following detailed description illustrates the claimed invention by way of example and not by way of limitation. This description will clearly enable one skilled in the art to make and use the claimed invention, and describes several embodiments, adaptations, variations, alternatives and uses of the claimed invention, including what I presently believe is the best mode of carrying out the claimed invention. Additionally, it is to be understood that the claimed invention is not limited in its application to the details of construction and the arrangements of components set forth in the following description or illustrated in the drawings. The claimed invention is capable of other embodiments and of being practiced or being carried out in various ways. Also, it is to be understood that the phraseology and terminology used herein is for the purpose of description and should not be regarded as limiting.

Basic copper gluconate when prepared correctly has a molecular formula of $C_6H_{12}CuO_8$—X $H_2O$ or $Cu[OH][C_6H_{11}O_7]$. The basic copper gluconate is made by first neutralizing glucono delta-lactone with basic copper carbonate to produce an aqueous solution of basic copper gluconate, as shown in Equation 1 below. The aqueous solution is then dried to form a free-flowing basic copper gluconate powder, as shown in Equation 2 below.

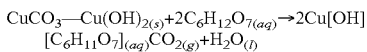

Eq. 1

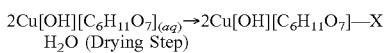

Eq. 2

The basic copper gluconate is believed to have the following structure:

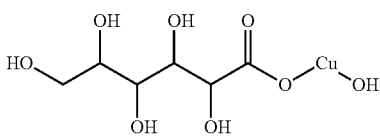

This structure can be shown ionically as follows:

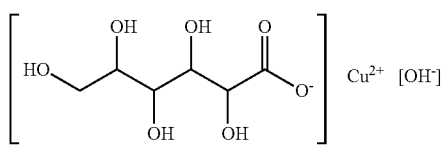

The basic copper gluconate has a molecular weight of 275.7 g/mol and copper content of 23.1% on the anhydrous basis. The basic copper gluconate complex typically is found to contain between 0.0-10.0% water depending on extent of drying. The copper content of the basic copper gluconate is 65% greater than that of copper gluconate (which has a copper content of 14%).

To demonstrate product uniqueness, matter of composition and product performance of basic copper gluconate, classical chemistry methodology (assay), infrared spectroscopy (FT-IR), X-ray diffraction (XRD) and aqueous solubility of basic copper gluconate were implemented and compared against copper gluconate.

Classical Chemistry Methodology

Three samples of the basic copper gluconate were prepared and analyzed for copper content using complexometric titration, per the procedure set forth below.

Dissolve the Sample of basic copper gluconate in 100 mL of water. Add 2 mL of glacial acetic acid and 5 g potassium iodide, mix, and titrate with Titrant (0.1 N sodium thiosulfate) to a light yellow color. Add 2 g of ammonium thiocyanate, and mix. Add 3 mL of starch TS, and continue titrating to a milk-white endpoint. Perform the blank determination.

Calculate the percentage of copper Sample taken:

Result=$\{[(V_S-V_B)\times N\times F]/W\}\times 100$ wherein, $V_S$=Titrant volume consumed by the Sample (mL)

$V_B$=Titrant volume consumed by the Blank (mL)

N=actual normality of the Titrant (mEq/mL)

F=equivalency factor, 63.55 mg/mEq

W=Sample weight (mg)

The water content of both samples was determined by thermogravimetric analysis (TGA) so that the anhydrous copper content could be calculated and compared to theoretical anhydrous copper content. The TGA was conducted using a TA Instruments Q550 HiRes thermographic analyzer. The three samples shown in Table 1, below, all contain the relative theoretical amount of copper that is consistent with the basic copper gluconate formula noted above.

TABLE 1

Copper Content, Water Content and Theoretical Assay Values for Basic Copper Gluconate

| Sample | % Cu (as is) | % Water | % Cu Anhydrous | % of Theoretical Cu (23.1%) |
|---|---|---|---|---|
| 1 | 21.5% | 7.8% | 23.3% | 101.2% |
| 2 | 21.7% | 7.9% | 23.5% | 101.2% |
| 3 | 21.1% | 8.1% | 23.0% | 99.6% |

FT-IR Spectroscopy

Figure 2:
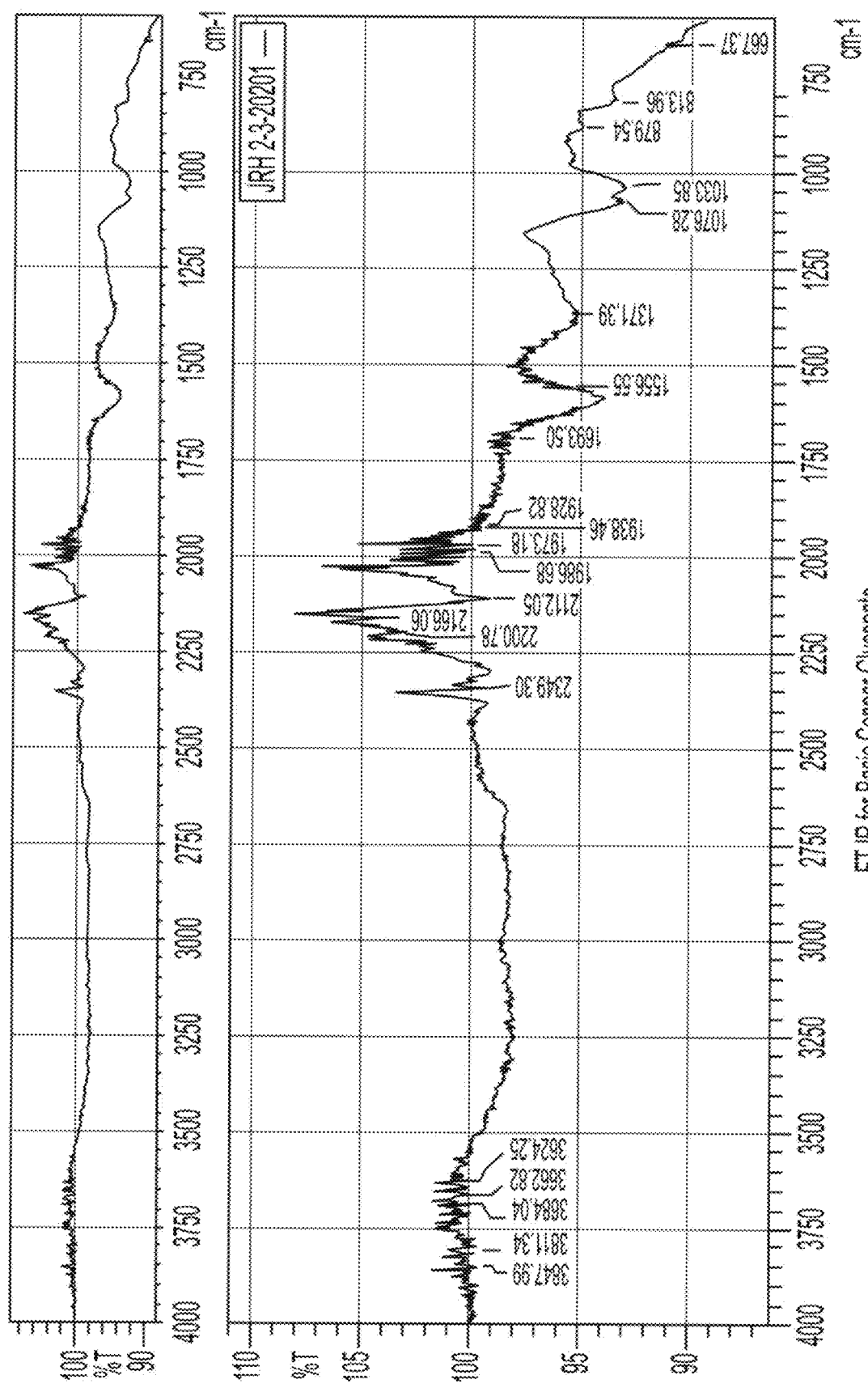
FIG. 2 is an FT-IR graph of basic copper gluconate.

Infrared spectroscopy was employed to demonstrate the uniqueness of the basic copper gluconate relative to copper gluconate as shown in FIGS. 1 and 2.

The FT-IR spectra of copper gluconate (FIG. 1) shows strong absorbances at 3250 cm$^{-1}$ and in the fingerprint region of 1600-1650 cm$^{-1}$, 1300-1400 cm$^{-1}$ and 1000-1100 cm$^{-1}$. There is also a distribution of strong absorbances between approximately 600-800 cm$^{-1}$.

The FT-IR spectra basic copper gluconate (FIG. 2), on the other hand, has weak absorbances in the fingerprint regions of 1560, 1371, 1076 and 1033 cm$^{-1}$ and a small distribution of weaker less defined absorbances at approximately 670 cm$^{-1}$. There is an absence of the strong peak at 3250 cm$^{-1}$ seen in the copper gluconate spectrum (FIG. 1).

The lack of absorbances in the noted fingerprint regions provides strong evidence that the basic copper gluconate is unique and different from copper gluconate.

Particle Morphology by Scanning Electron Microscopy

Figure 3:
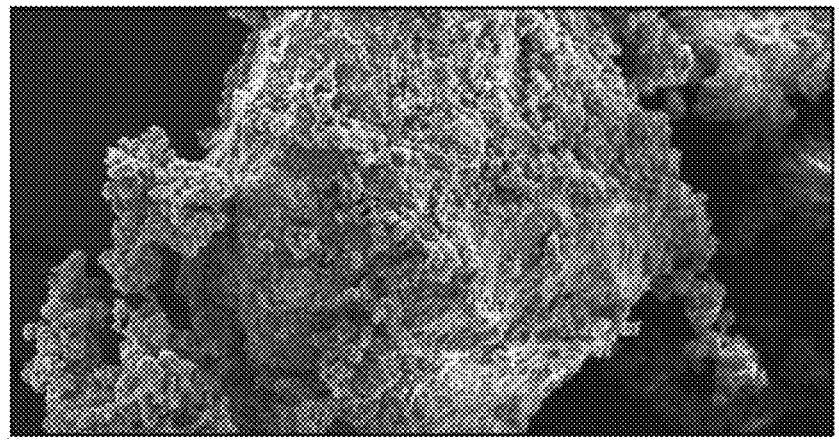
FIGS. 3 and 4 are SEM (Scanning Electron Microscopy) imaging of copper gluconate and basic copper gluconate, respectively.
Figure 4:
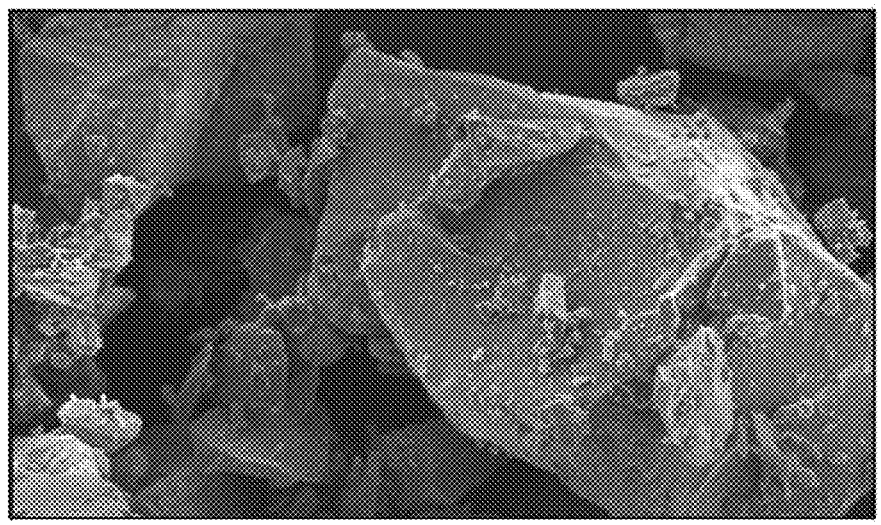

The unique nature of the basic copper gluconate can be both demonstrated and differentiated from copper gluconate. FIGS. 3 and 4 show SEM (Scanning Electron Microscopy) imaging of copper gluconate and basic copper gluconate, respectively.

As seen in FIG. 3, copper gluconate has a polycrystalline presentation, composed of many agglomerations of crystallites of varying size and orientation. As seen in the SEM imagery of FIG. 4, the basic copper gluconate is amorphous.

X-Ray Diffraction (XRD) Pattern Analysis

Figure 5:
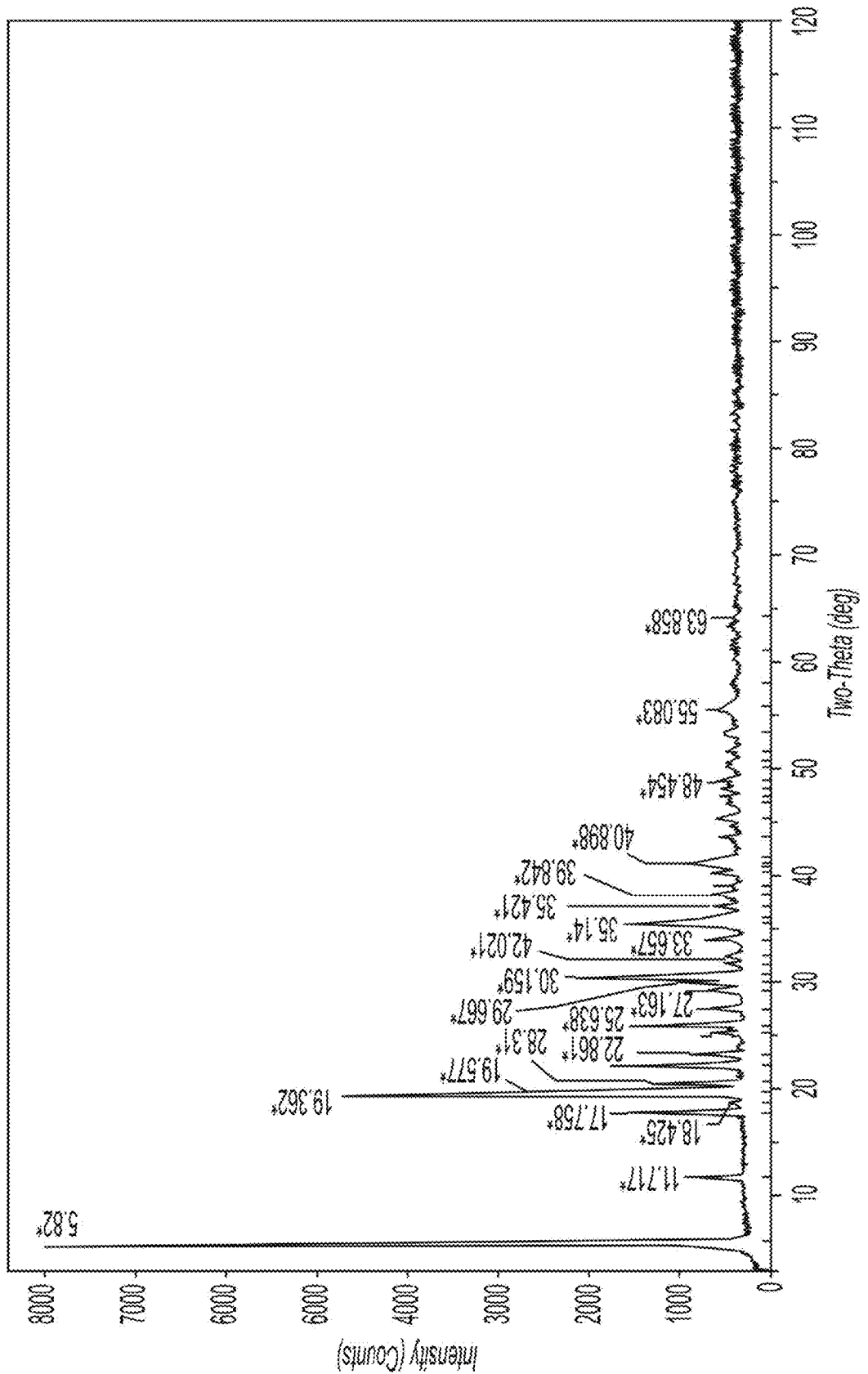
FIGS. 5 and 6 are X-ray diffraction (XRD) patterns for copper Gluconate and basic copper Gluconate, respectively.

The relatively high crystalline nature of copper gluconate is demonstrated by Particle Morphology by Scanning Electron Microscopy which produces a very distinct and reproducible XRD pattern as shown in FIG. 5.

Figure 6:
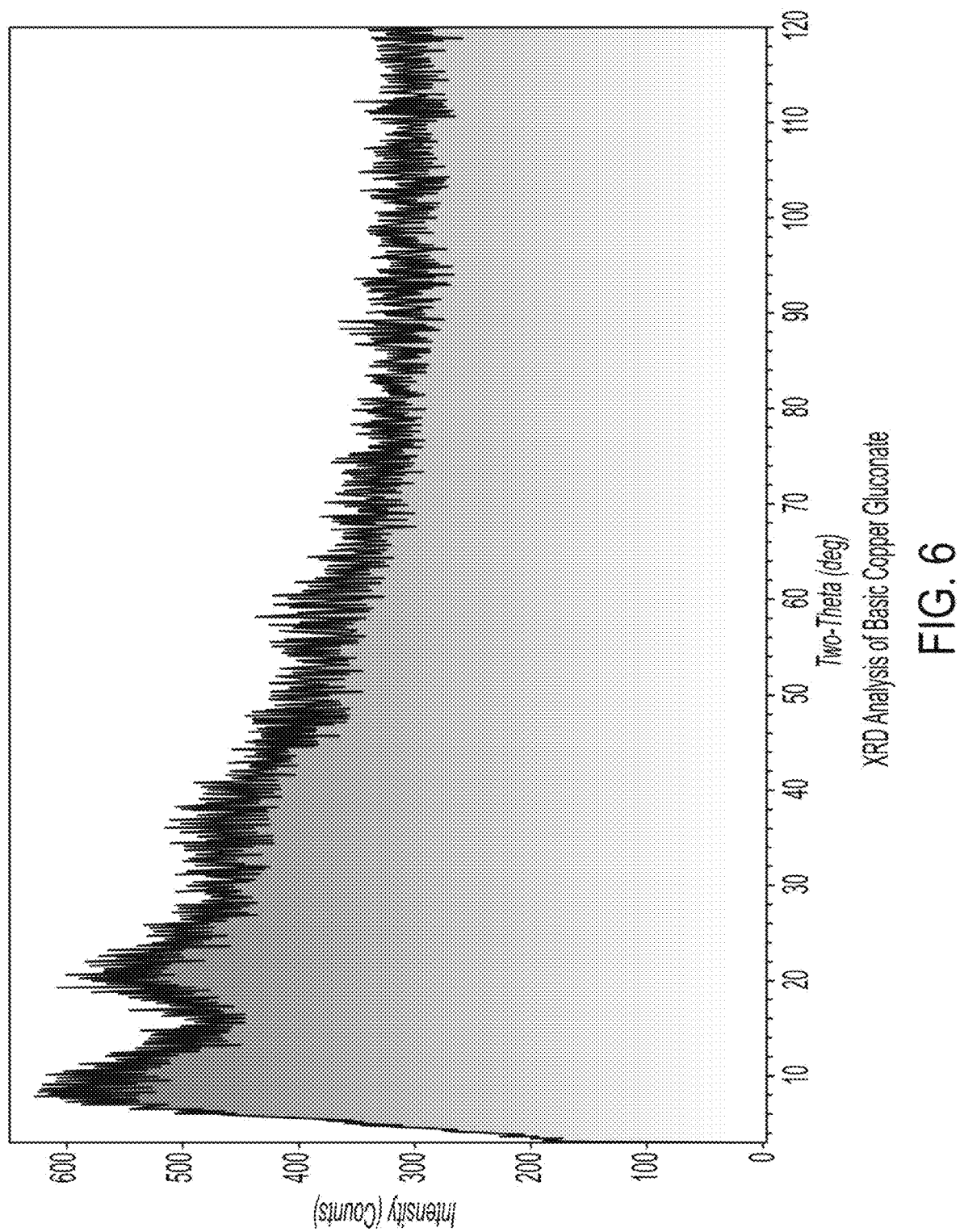

Due to the amorphous nature of basic copper gluconate, Particle Morphology by Scanning Electron Microscopy demonstrates that the basic copper gluconate does not show any degree of crystallinity by XRD as shown in FIG. 6.

Aqueous Solubility

Figure 7:
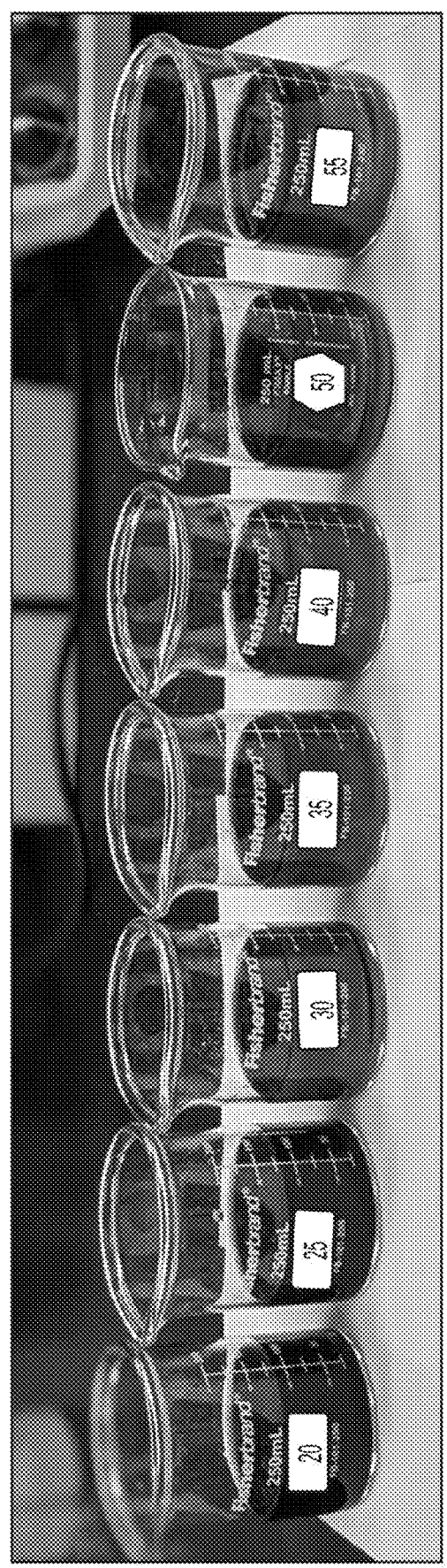
FIG. 7 is a photograph of beakers containing solutions of various percentages of basic copper gluconate to demonstrate stability of the basic copper gluconate under atmospheric condition.

Basic copper gluconate possesses excellent water solubility of over 50 g/100 g water. However, at higher concentrations (i.e., 30% and above), solutions are prone to secondary redox reactions if left to sit for prolonged periods in the open air. Copper (II) slowly oxidizes gluconic acid producing a red precipitate of cuprous oxide ($Cu_2O$). As shown in FIG. 7, only a 20% solution of basic copper gluconate is stable after 48 hours under atmospheric conditions. In the remaining samples (25%, 30%, 35%, 40%, 50% and 65%), cuprous oxide formed and precipitated out of the solution. This is less evident in the 25% solution of basic copper gluconate than in the remaining, higher percentage, solutions.

The obvious advantage over copper gluconate is that a 20% solution of basic copper gluconate would contain 4.62% soluble copper by weight compared to 2.88% from copper gluconate by weight, for a 60% increase in the copper loading of basic copper gluconate relative copper gluconate.

Examples

Lab Scale Preparation of Basic Copper Gluconate

A gluconic acid solution was prepared comprising 178 g glucono delta-lactone and 1000 g of DI water. The acid solution was heated to about 40° C. to about 60° C. and neutralized with 110 g of basic copper carbonate during a 4-8-hour digestion at about 40° C. to about 60° C. The resulting reaction mass contained 275.7 g of basic copper gluconate having a metal to ligand to hydroxyl ratio of 1:1:1 remaining in solution. The reaction mass was filtered to remove any unreacted basic copper carbonate and other extraneous matter. The filtrate was dried to produce a free-flowing powder of basic copper gluconate having a metal to ligand to hydroxyl ratio of 1:1:1 and a moisture content of 0.0-20.0%.

Pilot Plant Preparation of Basic Copper Gluconate

A gluconic acid solution was prepared comprising 1780 g glucono delta-lactone and 10000 g of DI water. The acid solution was heated to about 40° C. to about 60° C. and neutralized with 1100 g of basic copper carbonate during a 4-8-hour digestion at about 40° C. to about 60° C. The resulting reaction mass contained 2757 g of basic copper gluconate having a metal to ligand to hydroxyl ratio of 1:1:1 remaining in solution. The reaction mass was filtered to remove any unreacted basic copper carbonate and other extraneous matter. The filtrate was dried to produce a free-flowing powder of basic copper gluconate having a metal to ligand to hydroxyl ratio of 1:1:1 and a moisture content of 0.0-20.0%.

As various changes could be made in the above constructions without departing from the scope of the invention, it is intended that all matter contained in the above description or shown in the accompanying drawings shall be interpreted as illustrative and not in a limiting sense.

The invention claimed is:

1. A basic copper gluconate having a formula of $C_6H_{12}CuO_8$ and hydrates thereof.

2. The basic copper gluconate of claim 1, having the ionic structure of:

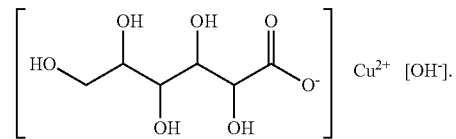

3. The basic copper gluconate of claim 1 wherein the basic copper gluconate is formed according to the following reaction:

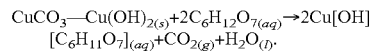

4. The basic copper gluconate of claim 1 wherein the basic copper gluconate is a free flowing powder having a moisture content of 0.0-20.0%.

5. The basic copper gluconate of claim 4 wherein the powder is formed by drying a neutralized solution of the basic copper gluconate.

* * * * *